(12) United States Patent
Saito et al.

(10) Patent No.: US 10,958,048 B2
(45) Date of Patent: Mar. 23, 2021

(54) PEELING DEVICE AND METHOD

(71) Applicant: HONDA MOTOR CO., LTD., Tokyo (JP)

(72) Inventors: Masafumi Saito, Tochigi (JP); Yoshiyuki Izumi, Tochigi (JP); Kenichiro Murata, Tochigi (JP); Eishi Yoshida, Tochigi (JP); Toru Eguchi, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 40 days.

(21) Appl. No.: 16/084,033

(22) PCT Filed: Feb. 6, 2017

(86) PCT No.: PCT/JP2017/004261
§ 371 (c)(1),
(2) Date: Sep. 11, 2018

(87) PCT Pub. No.: WO2017/159116
PCT Pub. Date: Sep. 21, 2017

(65) Prior Publication Data
US 2019/0348823 A1    Nov. 14, 2019

(30) Foreign Application Priority Data

Mar. 17, 2016 (JP) .............................. JP2016-054249

(51) Int. Cl.
*H02G 1/12* (2006.01)
*H01R 43/28* (2006.01)
*H02G 1/00* (2006.01)

(52) U.S. Cl.
CPC ........... *H02G 1/1248* (2013.01); *H02G 1/005* (2013.01); *H02G 1/1253* (2013.01); *H01R 43/28* (2013.01); *Y10T 29/514* (2015.01)

(58) Field of Classification Search
CPC .................................................... Y10T 29/514
(Continued)

(56) References Cited

U.S. PATENT DOCUMENTS

| 4,538,487 | A | * | 9/1985 | Hatfield | ............... | G02B 6/4498 |
| | | | | | | 81/9.51 |
| 6,546,617 | B1 | * | 4/2003 | Hayashi | ............... | H02G 1/1202 |
| | | | | | | 29/564.4 |

(Continued)

FOREIGN PATENT DOCUMENTS

| JP | 2001-238385 | 8/2001 |
| JP | 4462392 | 5/2010 |

(Continued)

OTHER PUBLICATIONS

Machine Translation of JP 2011-234447-A, which JP '447 was published Nov. 2011.*

(Continued)

*Primary Examiner* — Erica E Cadugan
(74) *Attorney, Agent, or Firm* — Rankin, Hill & Clark LLP

(57) ABSTRACT

A peeling device (12) includes a first peeling unit (21) and a second peeling unit (22). When an upper peeling die (33) and a lower peeling die (34) of the first peeling unit (21) are moved forward, an insulating coating (8) is peeled off from upper and lower surface of a coil conductor wire (2), and a conductive portion (7) is cut from the upper surface and the lower surface of the coil conductor wire (2). The conductive portion (7) is formed to have exposed portions (7*a*) and recessed portions (7*b*) cut in a trapezoidal shape. A front peeling die (42) and a rear peeling die (43) of the second peeling unit (22) are moved downward while the recessed portion (7*b*) is placed on and pressed against a second (Continued)

receiving section (41*b*) of a cradle (41), which peels off the insulating coating (8) and cuts the conductive portion (7).

1 Claim, 11 Drawing Sheets

(58) Field of Classification Search
USPC ........................................................ 29/564.4
See application file for complete search history.

(56) References Cited

U.S. PATENT DOCUMENTS

| | | | |
|---|---|---|---|
| 6,865,796 B1* | 3/2005 | Oohashi | H02K 3/12 |
| | | | 29/732 |
| 2014/0076498 A1* | 3/2014 | Sato | H01B 5/04 |
| | | | 156/701 |
| 2015/0052736 A1* | 2/2015 | Hayashi | H02K 15/0421 |
| | | | 29/596 |
| 2018/0083428 A1* | 3/2018 | Shigematsu | H02G 1/127 |
| 2019/0165555 A1* | 5/2019 | Yoshimura | H02G 1/127 |

FOREIGN PATENT DOCUMENTS

| | | |
|---|---|---|
| JP | 2011-182597 | 9/2011 |
| JP | 2011-234447 | 11/2011 |
| JP | 2015-43676 | 3/2015 |
| JP | 5681248 | 3/2015 |

OTHER PUBLICATIONS

International Search Report, dated Mar. 7, 2017 (Mar. 7, 2017), 2 pages.

* cited by examiner

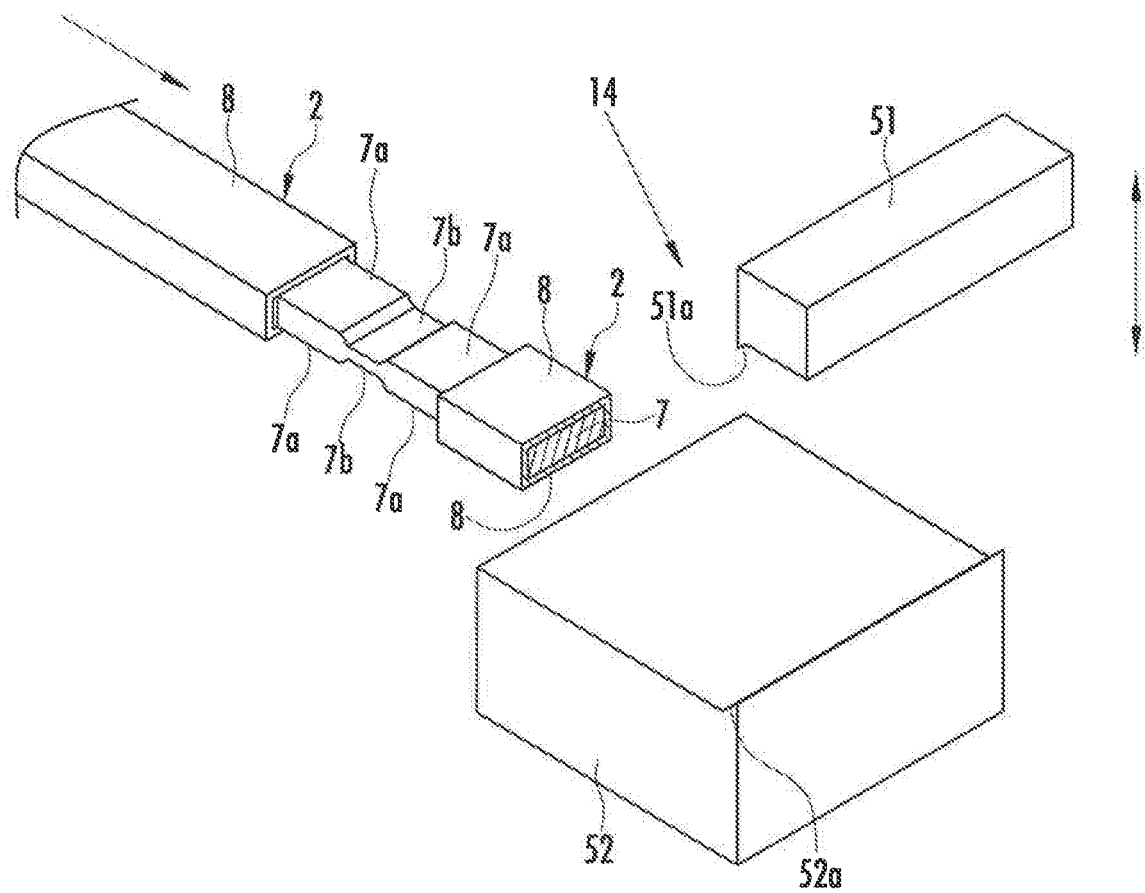

PEELING DEVICE AND METHOD

TECHNICAL FIELD

The present invention relates to a peeling device and method for peeling off an insulating coating from a coil conductor wire.

BACKGROUND ART

There is known a peeling device which peels off an insulating coating from a coil conductor wire including a conductor wire and the insulating coating covering the conductor wire (see, for example, Patent Literature 1). In a coil segment manufacturing apparatus according to Patent Literature 1, an insulating coating is peeled off from two facing surfaces of a coil conductor wire having four surfaces at a first peeling position by a peeling die, and the insulating coating is peeled off from the other two surfaces of the coil conductor wire at a second peeling position by a different peeling die.

In a method for manufacturing a stator of an AC generator described in Patent Literature 2, width-reduced portions are formed in a conductor wire by partly cutting opposite ends of the conductor wire. In Patent Literature 2, thickness-reduced portions are formed by rolling the width-reduced portions, and the conductor wire is cut at the thickness-reduced portions, thereby manufacturing a coil conductor wire having a width-reduced portion and a thickness-reduced portion at each of opposite ends.

Patent Literature 2 needs a rolling device which rolls a width-reduced portion to form a thickness-reduced portion separately from a peeling device which peels off an insulating coating. This leads to an increase in apparatus size and an increase in apparatus cost. For this reason, it is conceivable to form a thickness-reduced portion using a peeling die as illustrated in Patent Literature 1.

CITATION LIST

Patent Literature

Patent Literature 1: Japanese Patent No. 5681248
Patent Literature 2: Japanese Patent No. 4462392

SUMMARY OF INVENTION

Technical Problem

However, in a case where a thickness-reduced portion as in Patent Literature 2 is formed by partly cutting a conductor wire using a peeling die as in Patent Literature 1, a burr may appear in the conductor wire along a movement direction of the peeling die during cutting the conductor wire with the peeling die.

An object of the present invention, which has been made in consideration of the above-described circumstances, is to provide a peeling device and method capable of preventing the appearance of a burr in a case where the conductor wire is cut using the peeling die.

Solution to Problem

A peeling device according to the present invention is a peeling device for peeling off an insulating coating from a coil conductor wire which includes a conductor wire and the insulating coating covering the conductor wire, the coil conductor wire having a rectangular shape and extending in a predetermined direction, the device comprising a first peeling die arranged to be in parallel to one pair of facing first side surfaces which form the rectangular shape of the coil conductor wire and movable in a first direction orthogonal to the predetermined direction, the first peeling die being configured to peel off the insulating coating from the first side surfaces, a second peeling die arranged to be in parallel to one pair of second side surfaces which are orthogonal to the first side surfaces of the coil conductor wire and form the rectangular shape and movable in a second direction orthogonal to the predetermined direction, the second peeling die being configured to peel off the insulating coating from the second side surfaces of the coil conductor wire after the peeling-off of the insulating coating by the first peeling die and cut the conductor wire from the second side surfaces, and a cradle configured to receive the coil conductor wire during the peeling-off of the insulating coating and the cutting of the conductor wire by the second peeling die, wherein the first peeling die is provided with a cutting section extending in the second direction so as to peel off the insulating coating, cut the conductor wire, and form a recessed portion in the insulating coating and the conductor wire, and the cradle is provided with a receiving section configured to receive the recessed portion of the conductor wire.

According to the peeling device of the present invention, the conductor wire is cut by the second peeling die while the recessed portion of the conductor wire cut by the first peeling die is received by the receiving section provided at the cradle. It is thus possible to prevent a burr from appearing in the conductor wire along a movement direction of the second peeling die during the cutting of the conductor wire by the second peeling die.

Preferably, the cutting section is formed in a trapezoidal shape which decreases in a width in the predetermined direction toward a distal end, and the recessed portion of the conductor wire and the receiving section are formed in the same trapezoidal shape as the cutting section.

According to the above-described configuration, the recessed portion of the conductor wire can be formed in a trapezoidal shape.

Additionally, the receiving section preferably has a width in the predetermined direction larger than a width in the predetermined direction of the recessed portion of the conductor wire and the receiving section presses against the recessed portion when the receiving section is inserted in the recessed portion.

According to the above-described configuration, the receiving section can press against the recessed portion even if a position of the recessed portion is shifted in the predetermined direction during the peeling-off of the insulating coating and the cutting of the conductor wire by the second peeling die. This allows prevention of the appearance of a burr.

The receiving section is preferably arranged to receive at least opposite ends in the first direction of the recessed portion.

According to the above-described configuration, an area of the recessed portion of the conductor wire that is to be pressed and crushed by the receiving section can be made smaller than in a case where the receiving section is provided across a full width in the first direction. If a crushed portion of a conductor wire is large, a distance to an insulating coating at the time of fusion joining of the conductor wire is shorter than other portions, and the conductor wire may have heat effects, such as melting of the insulating coating. The configuration can curb the problem.

A peeling method according to the present invention is a peeling method for peeling off an insulating coating from a coil conductor wire which includes a conductor wire and the insulating coating covering the conductor wire, the coil conductor wire having a rectangular shape and extending in a predetermined direction, the method comprising a first step of peeling off the insulating coating from one pair of facing first side surfaces which form the rectangular shape of the coil conductor wire and cutting the conductor wire from the first side surfaces to form a recessed portion in the conductor wire and a second step of, after the first step, peeling off the insulating coating from one pair of second side surfaces which are orthogonal to the first side surfaces of the coil conductor wire and form the rectangular shape and cutting the conductor wire from the second side surfaces in a state of receiving the recessed portion in the conductor wire of the coil conductor wire.

According to the peeling method of the present invention, cutting of the conductor wire is performed as the second step while the recessed portion of the conductor wire cut in the first step is received by the receiving section. It is thus possible to prevent a burr from appearing in the conductor wire along a cutting direction of the conductor wire during the cutting of the conductor wire in the second step.

Advantageous Effect of Invention

The present invention allows prevention of the appearance of a burr in a case where a conductor wire is cut using a die.

BRIEF DESCRIPTION OF DRAWINGS

FIG. 8 is a perspective view showing a conductor wire cutoff unit and the coil conductor wire.

DESCRIPTION OF EMBODIMENTS

Embodiments of the present invention will be described below with reference to the drawings.

Figure 1:
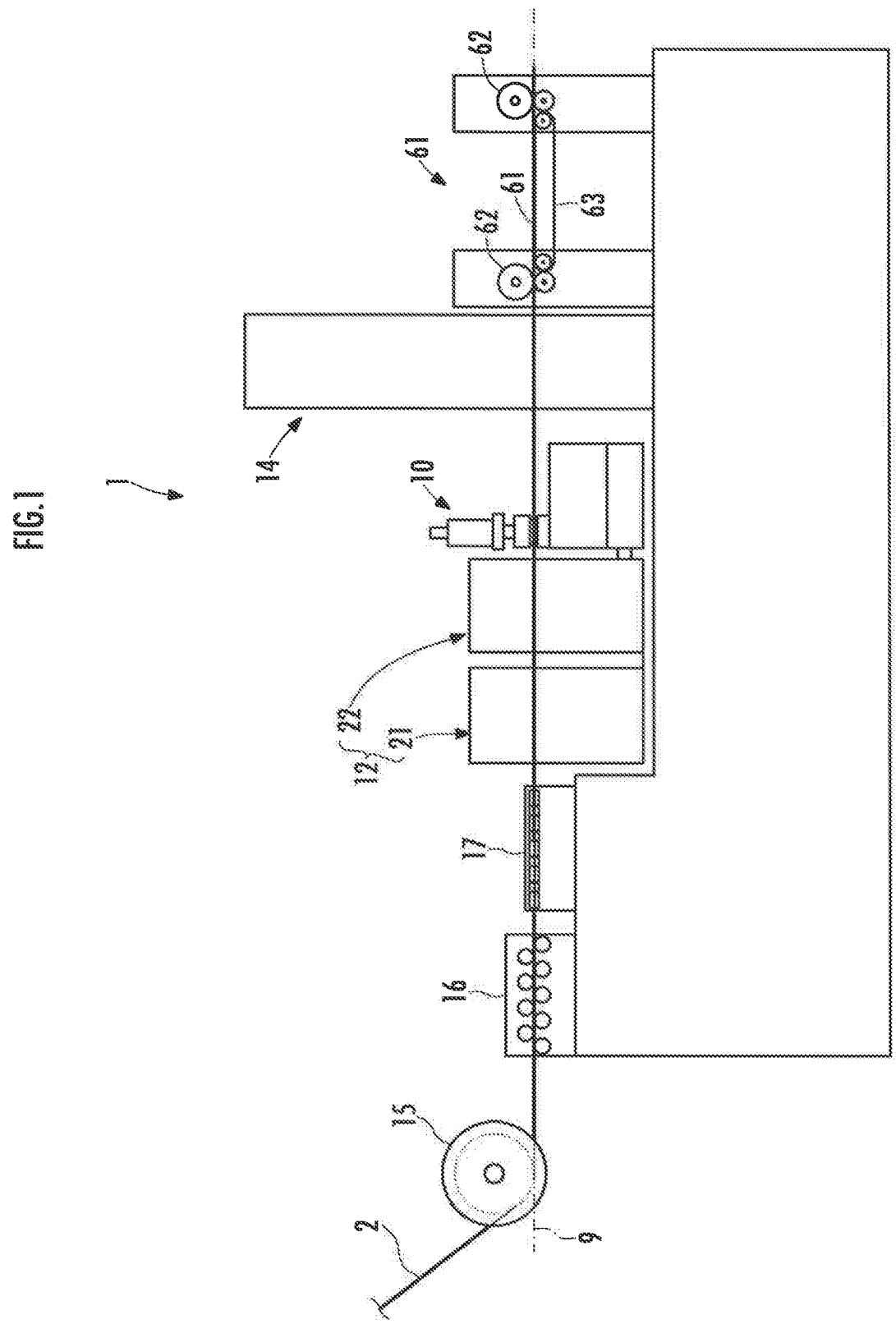
FIG. 1 is a side view showing a coil segment manufacturing apparatus.

As shown in FIG. 1, a coil segment manufacturing apparatus 1 manufactures, from a coil conductor wire 2 including an insulating coating 8 (see FIG. 2), a coil segment obtained by peeling off the insulating coating 8 from opposite ends of the coil conductor wire 2. The coil segment manufactured by the coil segment manufacturing apparatus 1 is used as a stator coil.

A conductor wire with a rectangular shape is used as the coil conductor wire 2. The coil conductor wire 2 is composed of a conductive portion 7 (a conductor wire) made of, e.g., copper and the insulating coating 8 that covers the conductive portion 7 (see FIG. 2). Note that examples of the rectangular shape include a shape with rounded corners.

The coil segment manufacturing apparatus 1 comprises a conductor wire feeding unit 10 which feeds the coil conductor wire 2 along a feed path 9, a peeling device 12 which cuts the conductive portion 7 of the coil conductor wire 2 on the feed path 9 and peels off the insulating coating 8, and a conductor wire cutoff unit 14 which cuts off the coil conductor wire 2 on the feed path 9. The coil conductor wire 2 is supplied from a conductor wire winding machine (not shown) to the coil segment manufacturing apparatus 1 and is introduced onto the feed path 9 via a roller 15.

A thickness direction correcting unit 16 and a width direction correcting unit 17 which linearly correct the introduced coil conductor wire 2 are provided between the roller 15 and the peeling device 12. The thickness direction correcting unit 16 corrects the introduced coil conductor wire 2 in a thickness direction. The width direction correcting unit 17 corrects the introduced coil conductor wire 2 in a width direction.

As will be described in detail later, the peeling device 12 comprises a first peeling unit 21 and a second peeling unit 22.

Figure 2:
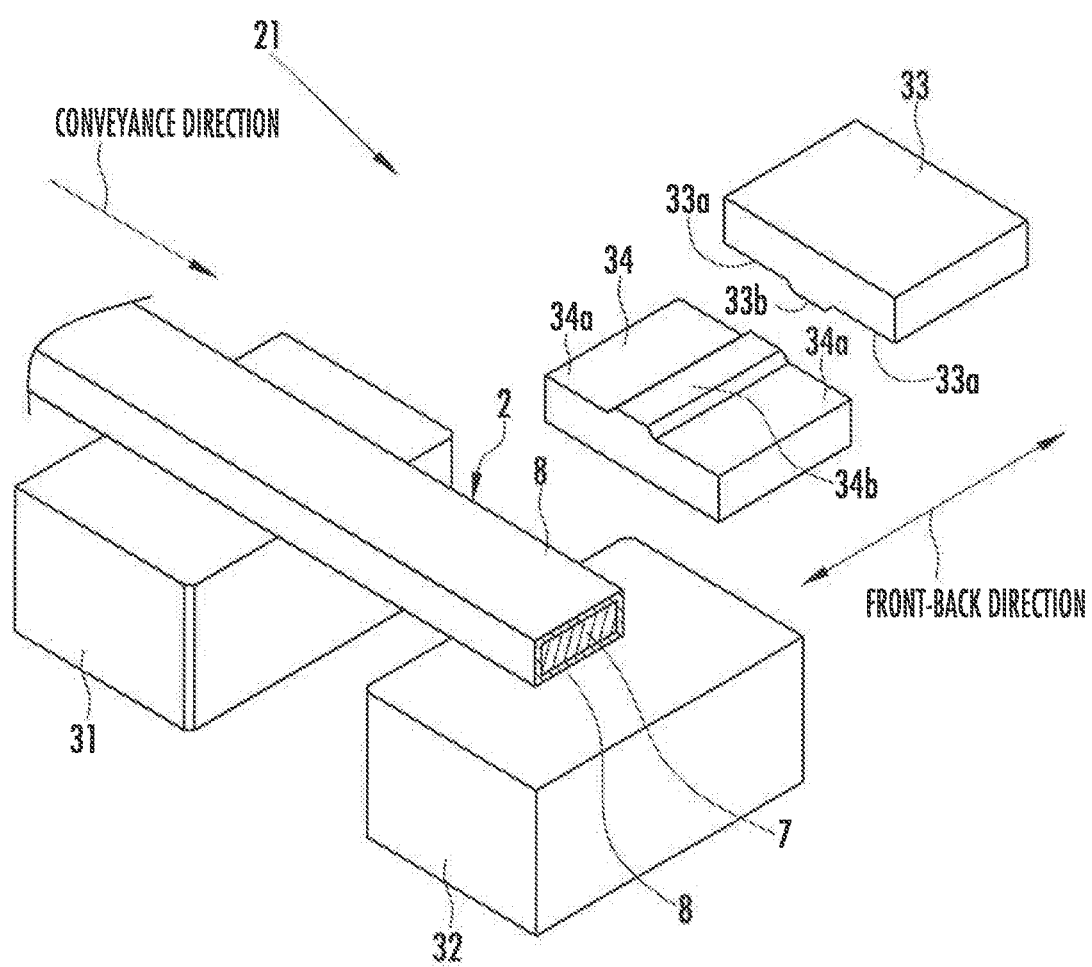
FIG. 2 is a perspective view showing a first peeling unit and a coil conductor wire.

As shown in FIG. 2, the first peeling unit 21 comprises a first cradle 31 and a second cradle 32 which receive the coil conductor wire 2 conveyed on the feed path 9, an upper peeling die 33, and a lower peeling die 34.

There is a gap between the first cradle 31 and the second cradle 32 such that the lower peeling die 34 is movable.

The lower peeling die 34 comprises insulating coating peeling sections 34*a* which peel off the insulating coating 8 from a lower surface side of the coil conductor wire 2 and a conductive portion cutting section 34*b* which peels off the insulating coating 8 from the lower surface side of the coil conductor wire 2 and cuts the conductive portion 7. The conductive portion cutting section 34*b* is formed in a trapezoidal shape which decreases in width toward an upper side.

Like the lower peeling die 34, the upper peeling die 33 comprises insulating coating peeling sections 33*a* and a conductive portion cutting section 33*b*. The conductive portion cutting section 33*b* is formed in a trapezoidal shape which decreases in width toward a lower side.

The insulating coating peeling sections 33a and 34a are each sharpened like a blade so as to be capable of peeling the insulating coating 8. The conductive portion cutting sections 33b and 34b are each sharpened like a blade so as to be capable of cutting the conductive portion 7 and peeling the insulating coating 8.

The upper peeling die 33 and the lower peeling die 34 are arranged to be movable in a front-back direction (a first direction) and are moved by a movement mechanism (not shown). Note that although the upper peeling die 33 and the lower peeling die 34 are drawn shifted in the front-back direction in FIG. 2 to illustrate the sections 34a and 34b of the lower peeling die 34, the upper peeling die 33 and the lower peeling die 34 are at the same position in the front-back direction.

Figure 3A:
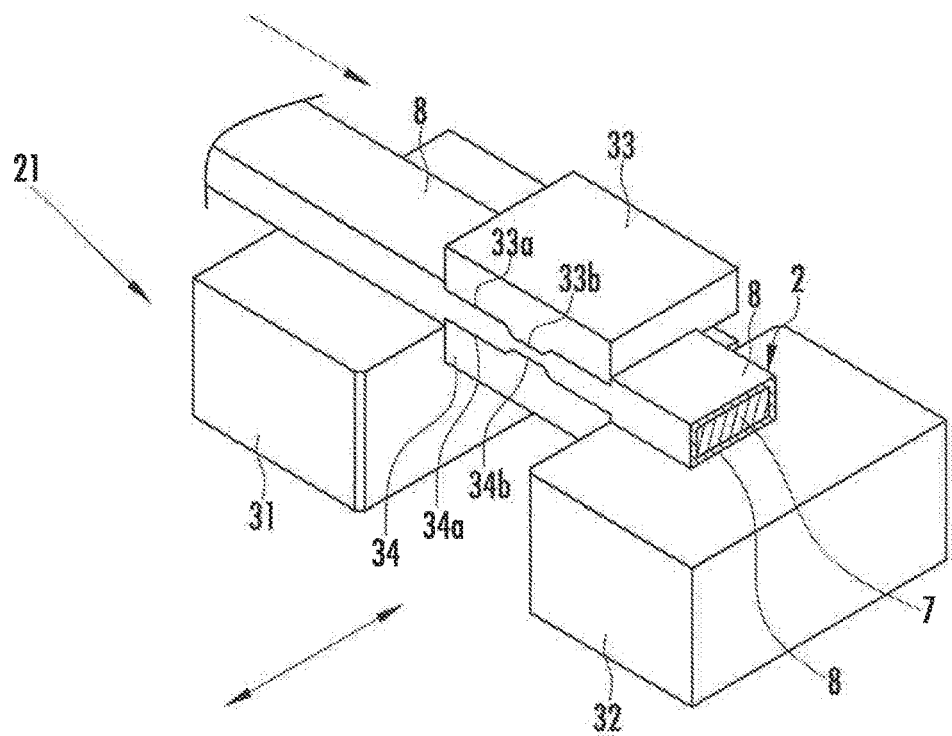
FIG. 3A is a perspective view showing a state during peeling of the insulating coating and whittling of the conductive portion by the first peeling unit.

As shown in FIG. 3A, when the coil conductor wire 2 is conveyed to a position where peeling and cutting is to be performed by the first peeling unit 21, the upper peeling die 33 and the lower peeling die 34 are moved forward by the movement mechanism, and peeling and cutting of the coil conductor wire 2 placed on the first and second cradles 31 and 32 are started.

Figure 3B:
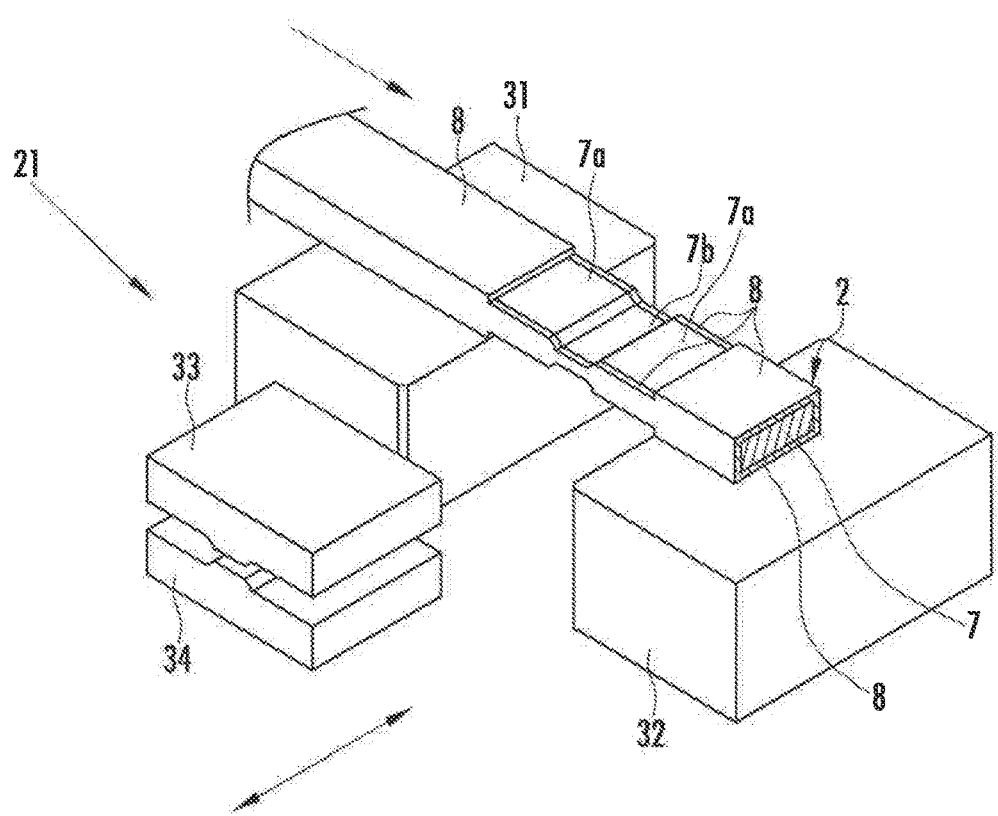
FIG. 3B is a perspective view showing a state after the peeling of the insulating coating and the whittling of the conductive portion by the first peeling unit.

As shown in FIG. 3B, the upper peeling die 33 and the lower peeling die 34 are moved forward to a position away from the coil conductor wire 2 by the movement mechanism. With this operation, the insulating coating 8 is peeled off from an upper surface side of the coil conductor wire 2 by the insulating coating peeling section 33a and the conductive portion cutting section 33b, and the conductive portion 7 is cut from the upper surface side of the coil conductor wire 2 by the conductive portion cutting section 33b. The upper peeling die 33 and the lower peeling die 34 are moved to an initial position shown in FIG. 2 by the movement mechanism after the peeling and the cutting.

The insulating coating 8 is peeled off from the lower surface side of the coil conductor wire 2 by the insulating coating peeling section 34a and the conductive portion cutting section 34b, and the conductive portion 7 is cut from the lower surface side of the coil conductor wire 2 by the conductive portion cutting section 34b.

In the conductive portion 7 of the coil conductor wire 2 after the peeling and the cutting by the first peeling unit 21, exposed portions 7a which are exposed and recessed portions 7b which are cut in a trapezoidal shape are formed. In the conductive portion cutting sections 33b and 34b of the upper peeling die 33 and the lower peeling die 34, the inclination of each trapezoidal portion is set such that an inclination angle of a trapezoidal portion of the recessed portion 7b is 5° to 60°.

The coil conductor wire 2 after the cutting of the conductive portion 7 and the peeling of the insulating coating 8 by the first peeling unit 21 is conveyed to the second peeling unit 22.

Figure 4:
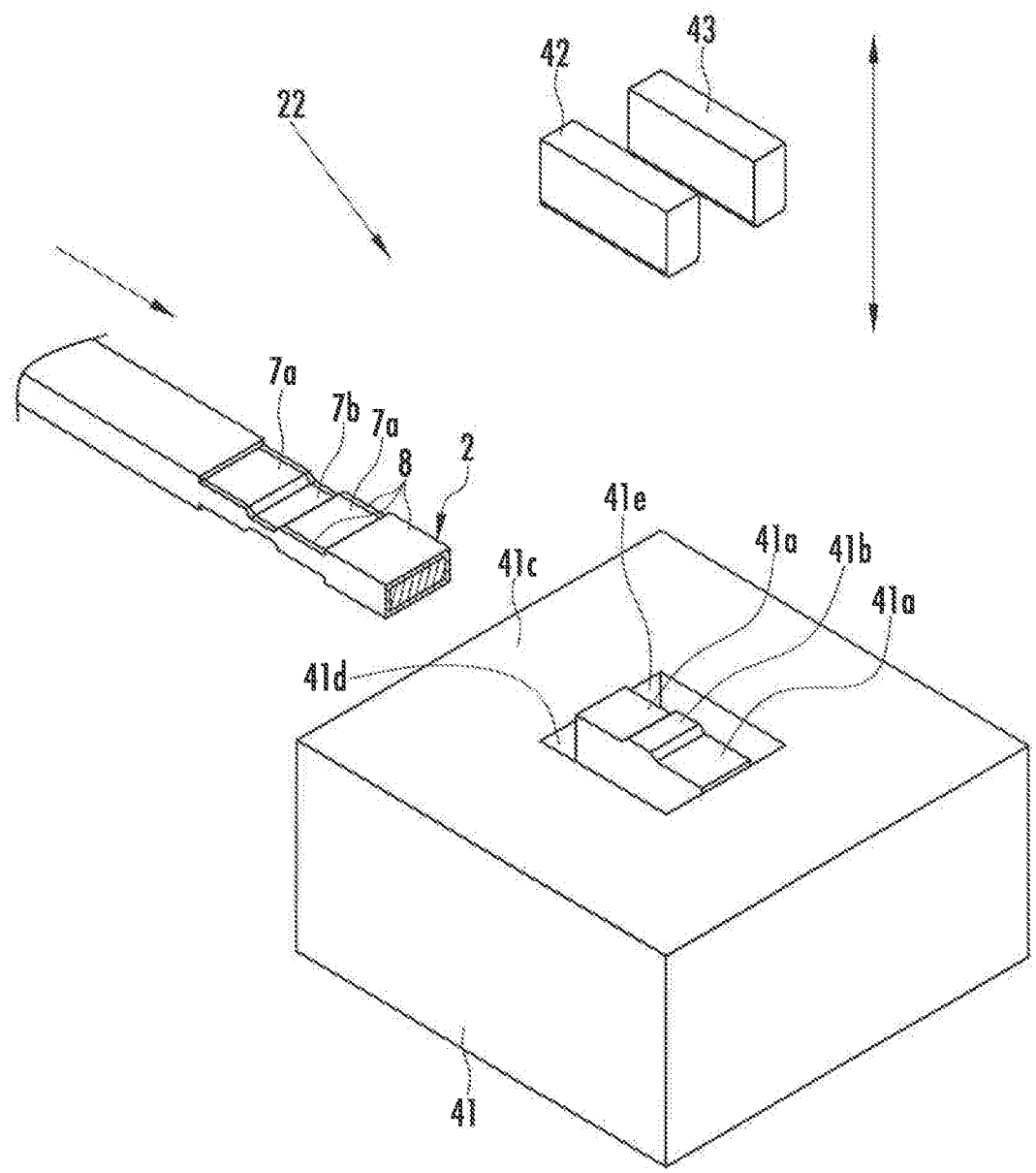
FIG. 4 is a perspective view showing a second peeling unit and the coil conductor wire.

As shown in FIG. 4, the second peeling unit 22 comprises a cradle 41 which receives the coil conductor wire 2 and a front peeling die 42 and a rear peeling die 43 which cut the conductive portion 7 and peel the insulating coating 8.

The cradle 41 comprises first receiving sections 41a which receive the exposed portions 7a of the conductive portion 7, a second receiving section 41b which receives and presses against the recessed portion 7b of the conductive portion 7, and a third receiving section 41c which receives a portion of the insulating coating 8. A front insertion hole 41d, into which the front peeling die 42 is to be inserted, and a rear insertion hole 41e, into which the rear peeling die 43 is to be inserted, are formed in front of and behind the first and second receiving sections 41a and 41b of the cradle 41.

The second receiving section 41b is formed in almost the same trapezoidal shape as the recessed portion 7b so as to receive the recessed portion 7b of the conductive portion 7 cut in the trapezoidal shape by the conductive portion cutting section 34b of the first peeling unit 21.

The front peeling die 42 and the rear peeling die 43 are arranged to be movable in a vertical direction (a second direction) and are moved by a movement mechanism (not shown). Portions of the front peeling die 42 and the rear peeling die 43 which cut the conductive portion 7 and peel the insulating coating 8 are each sharpened like a blade so as to be capable of cutting the conductive portion 7 and peeling the insulating coating 8.

Figure 5:
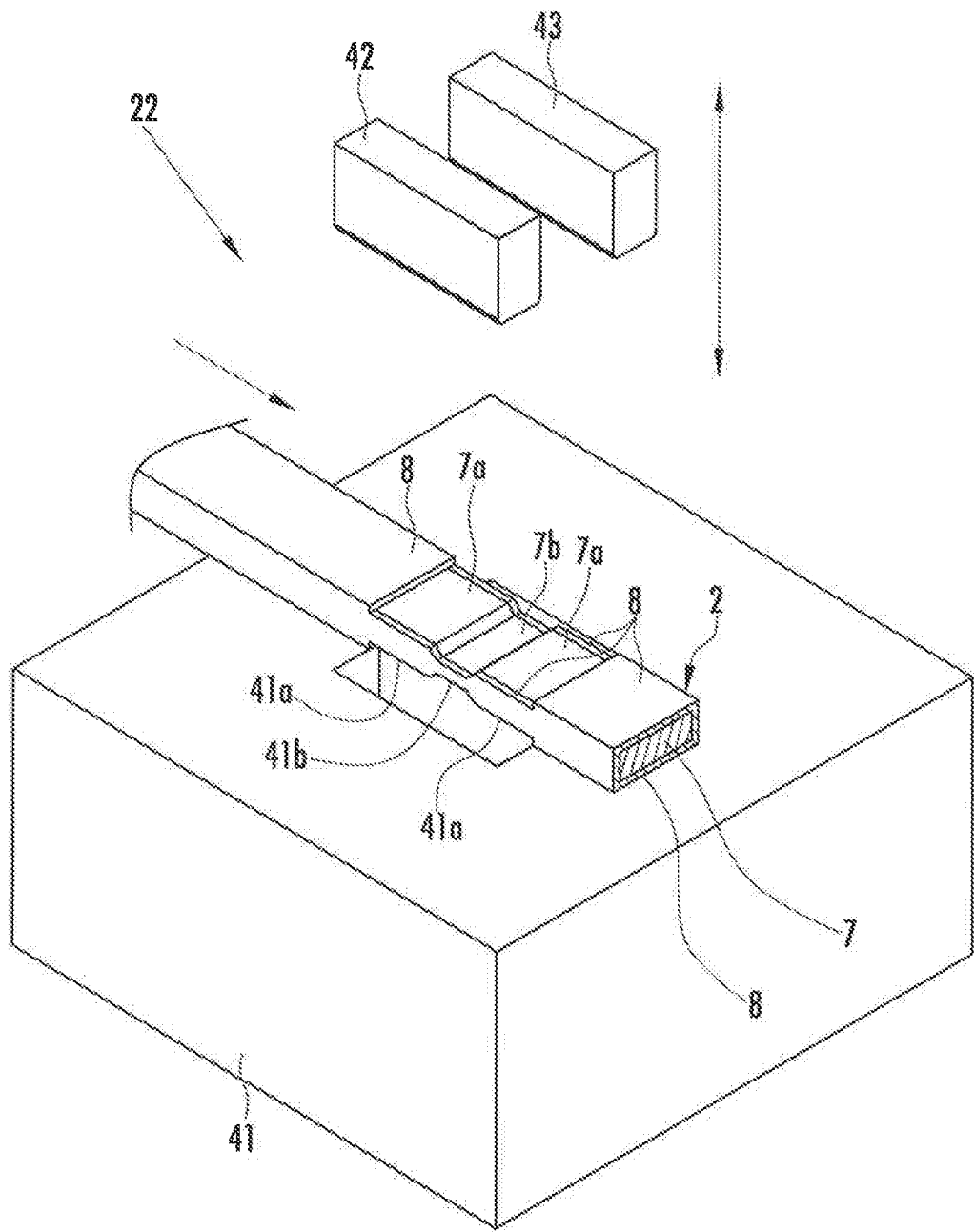
FIG. 5 is a perspective view showing a state in which the coil conductor wire is set on the second peeling unit.
Figure 6:
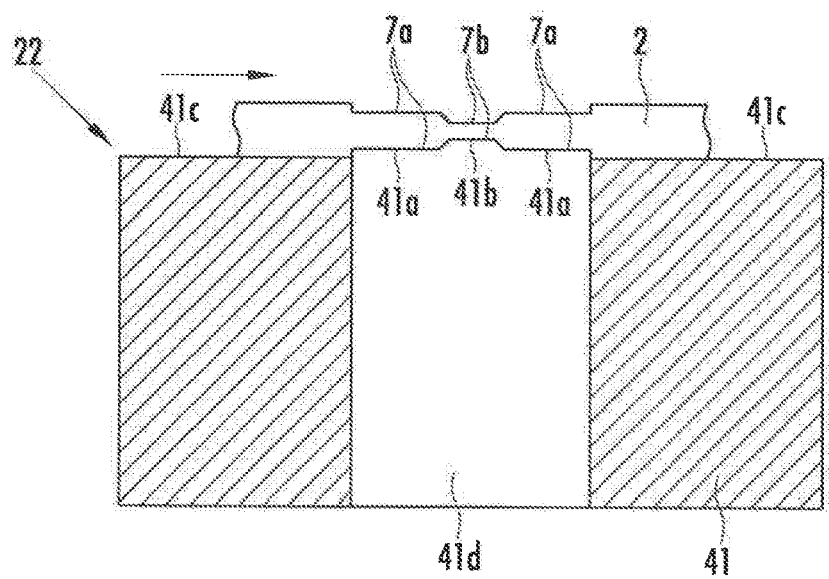
FIG. 6 is a side cross-sectional view showing the state in which the coil conductor wire is set on the second peeling unit.

As shown in FIGS. 5 and 6, when the coil conductor wire 2 is conveyed to a position where peeling is to be performed by the second peeling unit 22, the second receiving section 41b of the cradle 41 receives the recessed portion 7b of the conductive portion 7 of the coil conductor wire 2, the first receiving sections 41a receive the exposed portions 7a of the conductive portion 7, and the third receiving section 41c receives the insulating coating 8. At this time, the second receiving section 41b is pressing against the recessed portion 7b.

Figure 7:
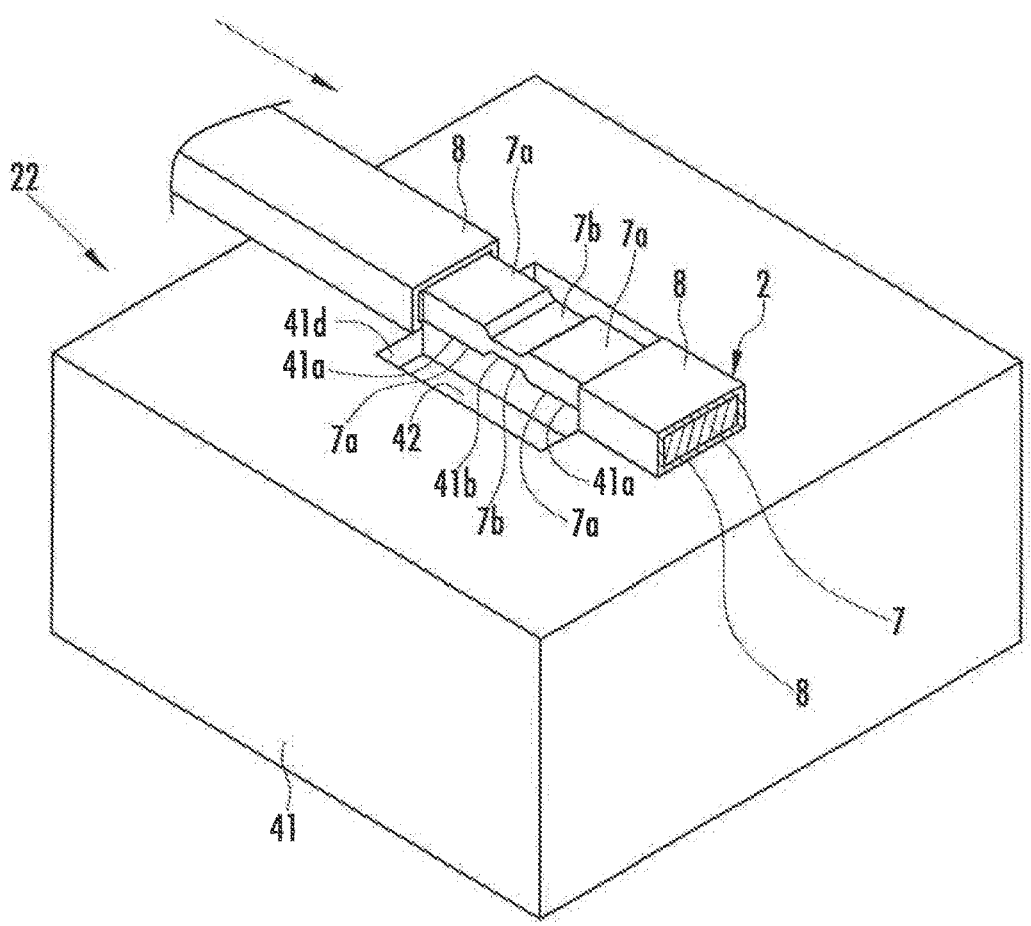
FIG. 7 is a perspective view showing a state after peeling of the insulating coating and cutting of the conductive portion by the second peeling unit.

As shown in FIG. 7, when the front peeling die 42 and the rear peeling die 43 are moved downward by the movement mechanism, the coil conductor wire 2 is peeled.

The front peeling die 42 and the rear peeling die 43 are moved downward to a position where the front peeling die 42 and the rear peeling die 43 are inserted in the front insertion hole 41d and the rear insertion hole 41e. With this operation, the insulating coating 8 is peeled off from a front side of the coil conductor wire 2 by the front peeling die 42, and the conductive portion 7 is cut from the front side of the coil conductor wire 2 by the front peeling die 42.

The insulating coating 8 is peeled off from a rear side of the coil conductor wire 2 by the rear peeling die 43, and the conductive portion 7 is cut from the rear side of the coil conductor wire 2 by the rear peeling die 43. With this operation, in a portion subjected to the peeling by the first peeling unit 21 and the second peeling unit 22, the insulating coating 8 is entirely peeled off, and the conductive portion 7 is exposed. The front peeling die 42 and the rear peeling die 43 are moved to an initial position shown in FIG. 4 by the movement mechanism after the peeling and the cutting.

The coil conductor wire 2 after the cutting of the conductive portion 7 and the peeling of the insulating coating 8 by the second peeling unit 22 is conveyed to the conductor wire cutoff unit 14.

As shown in FIG. 8, the conductor wire cutoff unit 14 comprises an upper cutter 51 and a lower cutter 52. The upper cutter 51 is arranged to be movable in the vertical direction and is moved by a movement mechanism (not shown). A blade portion 51a of the upper cutter 51 is formed in a tapered shape to have almost the same angle as an inclined surface of the recessed portion 7b of the coil conductor wire 2. Similarly, a blade portion 52a of the lower cutter 52 is formed in a tapered shape to have almost the same angle as an inclined surface of the recessed portion 7b of the coil conductor wire 2. Note that the angles of the blade portions 51a and 52a are preferably the same as or more acute than the inclination angle of the recessed portion 7b.

Figure 9A:
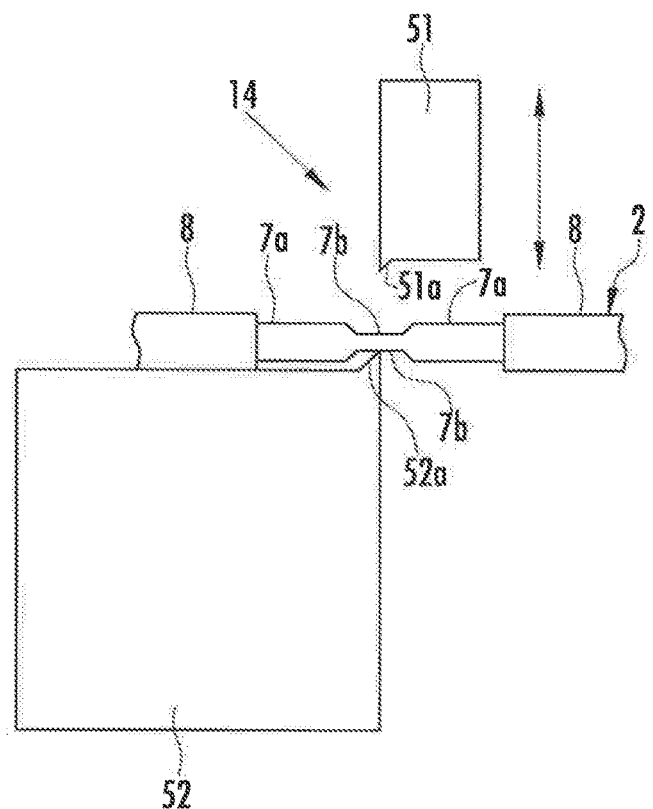
FIG. 9A is a side view showing the conductor wire cutoff unit and the coil conductor wire before a coil conductor wire cutoff.

As shown in FIG. 9A, when the coil conductor wire 2 is conveyed to a position where cutoff is to be performed by the conductor wire cutoff unit 14, the recessed portion 7b of the coil conductor wire 2 is placed on the blade portion 52a of the lower cutter 52.

Figure 9B:
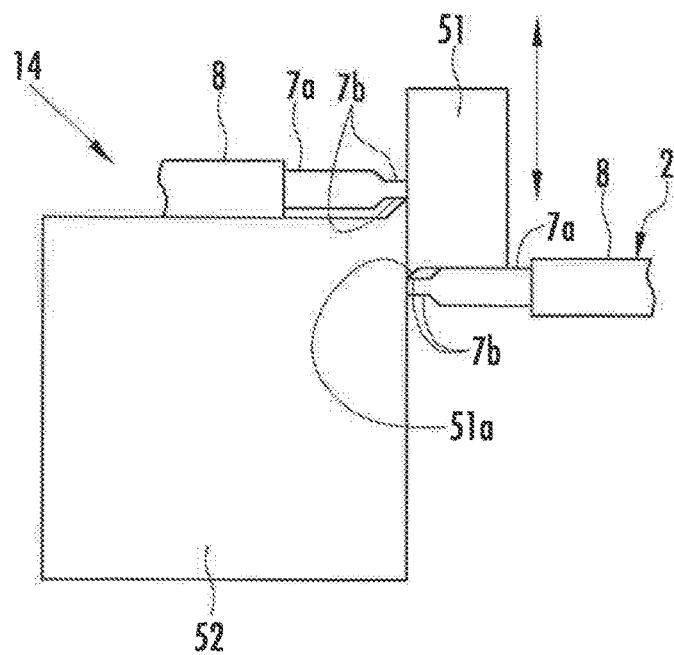
FIG. 9B is a side view showing the conductor wire cutoff unit and the coil conductor wire after the coil conductor wire cutoff.
Figure 10:
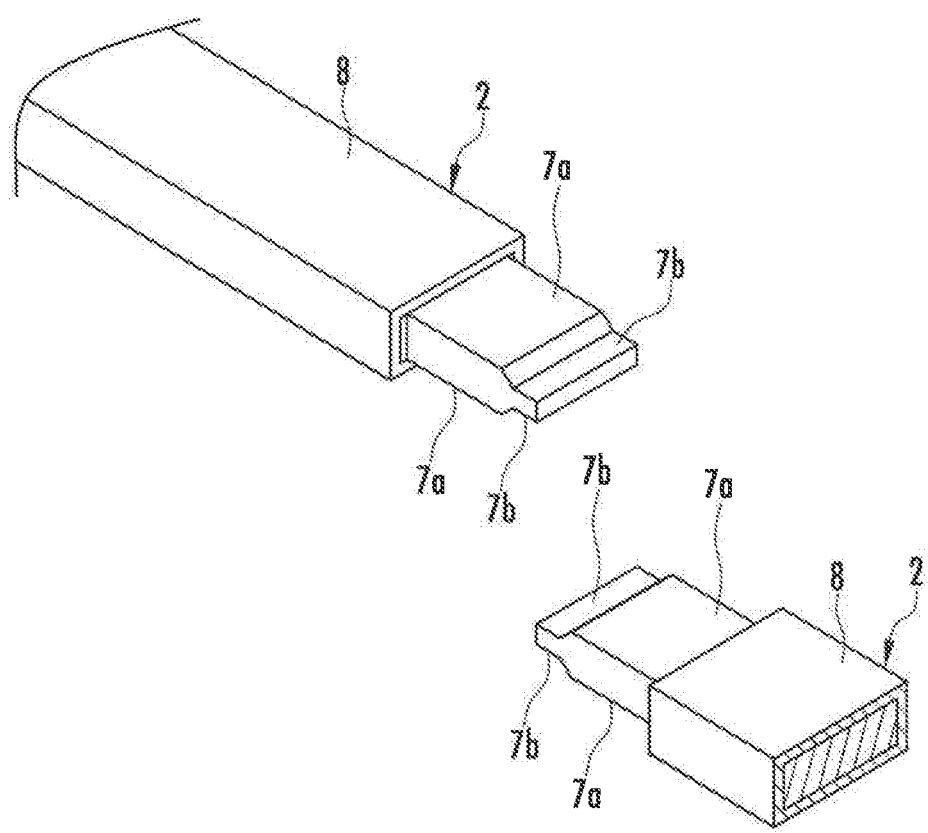
FIG. 10 is a perspective view showing the coil conductor wire after the cutoff.

As shown in FIG. 9B, when the upper cutter 51 is moved downward by the movement mechanism, the coil conductor wire 2 is cut off at the recessed portion 7b. With this operation, the coil conductor wire 2 having the exposed portions 7a and the recessed portions 7b formed at a rear end and the coil conductor wire 2 having the exposed portions 7a and the recessed portions 7b formed at a distal end are manufactured, as shown in FIG. 10. The upper cutter 51 is moved to an initial position shown in FIGS. 8 and 9A by the movement mechanism after the cutoff.

As shown in FIG. 1, a transfer unit 61 is provided downstream of the conductor wire cutoff unit 14. The transfer unit 61 comprises a conveyance roller 62 and a belt conveyor 63 and transfers, as a coil segment (not shown), a portion separated from the coil conductor wire 2 by cutoff by the conductor wire cutoff unit 14 to a next stage.

If the front peeling die 42 and the rear peeling die 43 peel the insulating coating 8 and cut the conductive portion 7 while the cradle 41 that is not provided with the second receiving section 41b according to the present embodiment is receiving the coil conductor wire 2, a burr may appear at opposite ends in the front-back direction of the recessed portion 7b along a movement direction of the dies 42 and 43.

Since the second receiving section 41b in the same shape as the recessed portion 7b of the conductive portion 7 presses against the recessed portion 7b in the present embodiment, the appearance of a burr as described above can be prevented.

Note that the second receiving section 41b may just abut on and receive the recessed portion 7b instead of pressing against the recessed portion 7b. In this case as well, the appearance of a burr as described above can be prevented.

Figure 11:
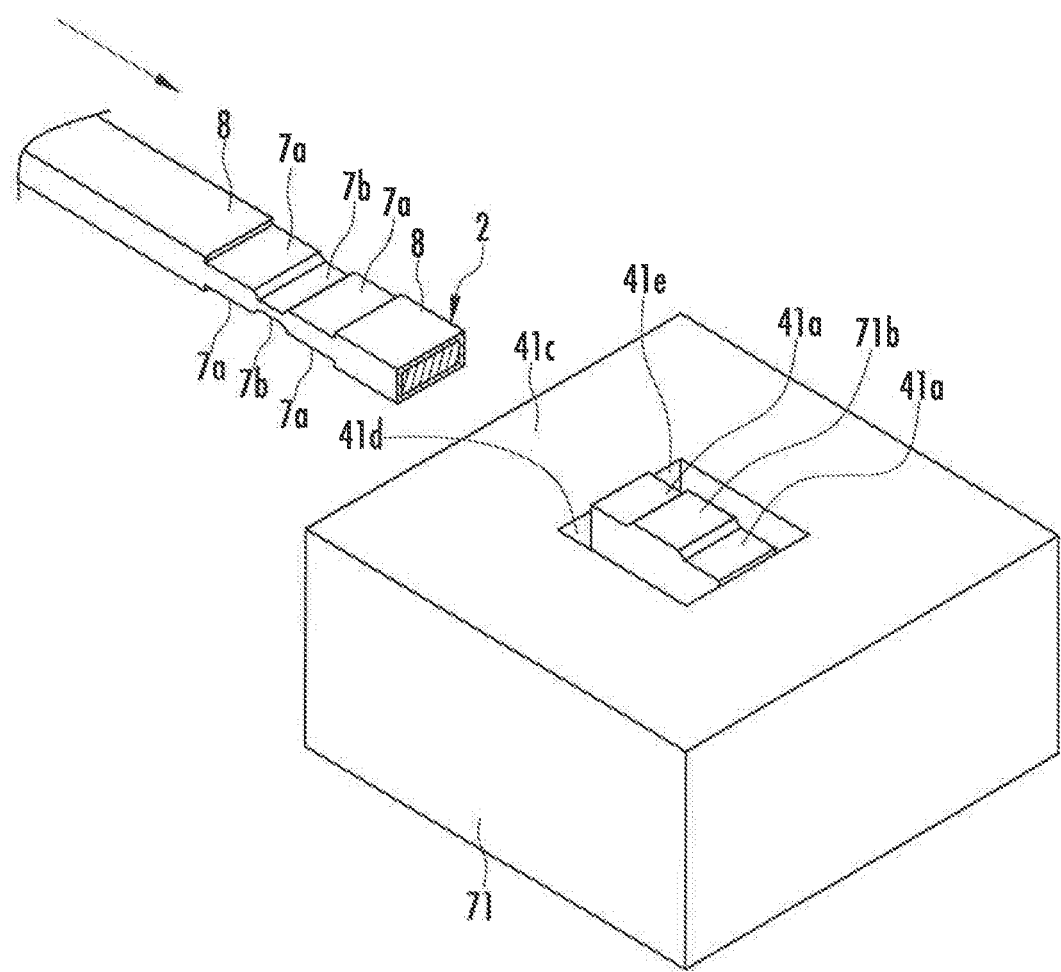
FIG. 11 is a perspective view showing a cradle and a coil conductor wire in an embodiment in which a receiving section of the cradle is larger than a recessed portion of a conductive portion.

Although the second receiving section 41b of the cradle 41 of the second peeling unit 22 is formed to be of almost the same size as the recessed portion 7b of the conductive portion 7 in the above-described embodiment, a cradle 71, a second receiving section 71b of which is formed to be wider in a conveyance direction than a recessed portion 7b, may be used, as shown in FIG. 11. Note that the same constituent members as those in the above-described embodiment are denoted by the same reference numerals and that a detailed description thereof will be omitted.

In the present embodiment, the second receiving section 71b is inserted into the recessed portion 7b even if a coil conductor wire 2 is shifted from a predetermined position in the conveyance direction during peeling by a second peeling unit 22. This allows prevention of the appearance of a burr.

Figure 12:
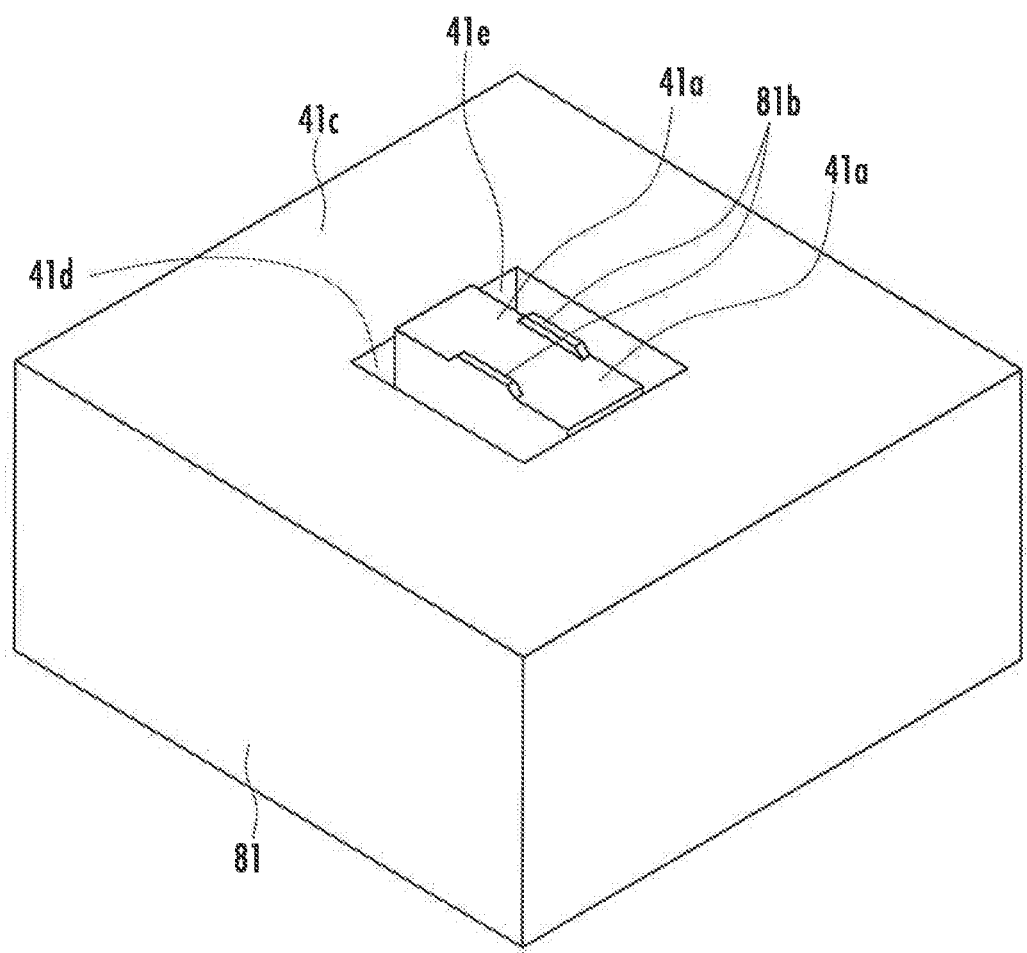
FIG. 12 is a perspective view showing a cradle in an embodiment in which a receiving section that receives a recessed portion of a conductive portion has a shape with an empty space in the middle.

Although the second receiving section 41b of the cradle 41 of the second peeling unit 22 is formed across a full width in the above-described embodiment, the second receiving section 41b may be formed at least at the opposite ends in the front-back direction where a burr as described above may appear. As shown in FIG. 12, a cradle 81 in a shape with an empty space in the middle in which second receiving sections 81b are provided only at opposite ends in a front-back direction may be used. Note that the same constituent members as those in the above-described embodiment are denoted by the same reference numerals and that a detailed description thereof will be omitted.

In the above-described embodiment, the first peeling unit 21 performs peeling and cutting by moving the upper peeling die 33 and the lower peeling die 34 in the front-back direction, and the second peeling unit 22 performs peeling and cutting by vertically moving the front peeling die 42 and the rear peeling die 43. The first peeling unit 21 may perform peeling and cutting by vertically moving dies, and the second peeling unit 22 may perform peeling and cutting by moving dies in the front-back direction.

Although the conductive portion cutting sections 33b and 34b of the upper and lower peeling dies 33 and 34 are each formed in a trapezoidal shape which decreases in an axial width along a convex direction in the above-described embodiment, the conductive portion cutting sections 33b and 34b may be linearly formed.

The coil conductor wire 2 is not limited to a rectangular shape in cross-section and may have a square shape in cross-section, a circular shape in cross-section, or an elliptical shape in cross-section.

REFERENCE SIGNS LIST 1 coil segment manufacturing apparatus
2 coil conductor wire
7 conductive portion
7a exposed portion
7b recessed portion
8 insulating coating
9 feed path
10 conductor wire feeding unit
12 peeling device
14 conductor wire cutoff unit
21 first peeling unit
22 second peeling unit
31 first cradle
32 second cradle
33 upper peeling die
33a, 34a insulating coating peeling section
33b, 34b conductive portion cutting section
34 lower peeling die
41, 71, 81 cradle
41a first receiving section
41b, 71b, 81b second receiving section
41c third receiving section
41d front insertion hole
41e rear insertion hole
42 front peeling die
43 rear peeling die
51 upper cutter
51a, 52a blade portion
52 lower cutter
61 transfer unit
62 conveyance roller
63 belt conveyor
64 coil segment

The invention claimed is:

1. A peeling method for peeling off an insulating coating from a conductor wire, the conductor wire including a conductive portion and the insulating coating covering the conductive portion, the conductor wire having a rectangular shape and extending in a predetermined direction, the method comprising:

a first step of peeling off the insulating coating from one pair of facing first side surfaces which form the rectangular shape of the conductor wire and cutting a part of the conductive portion from the first side surfaces to form a recessed portion in the conductive portion; and a second step of, after the first step, peeling off the insulating coating from one pair of second side surfaces which are orthogonal to the first side surfaces of the conductor wire and form the rectangular shape and cutting a part of the conductive portion from the second side surfaces in a state of receiving the recessed portion of the conductive portion by a receiving section which fits within the recessed portion of the conductive portion and presses the recessed portion of the conductive portion.

\* \* \* \* \*